United States Patent
Sasaki et al.

(10) Patent No.: US 12,188,770 B2
(45) Date of Patent: Jan. 7, 2025

(54) SURVEY DATA PROCESSING APPARATUS, SURVEY DATA PROCESSING METHOD AND SURVEY DATA PROCESSING PROGRAM

(71) Applicant: Topcon Corporation, Tokyo (JP)

(72) Inventors: Takeshi Sasaki, Tokyo (JP); Hideki Morita, Tokyo (JP)

(73) Assignee: Topcon Corporation, Tokyo (JP)

( * ) Notice: Subject to any disclaimer, the term of this patent is extended or adjusted under 35 U.S.C. 154(b) by 368 days.

(21) Appl. No.: 17/655,702

(22) Filed: Mar. 21, 2022

(65) Prior Publication Data

US 2022/0307832 A1  Sep. 29, 2022

(30) Foreign Application Priority Data

Mar. 29, 2021 (JP) .................... 2021-055353

(51) Int. Cl.
*G01C 15/00* (2006.01)

(52) U.S. Cl.
CPC ........ *G01C 15/002* (2013.01); *G06F 2218/08* (2023.01)

(58) Field of Classification Search
CPC ....... G01C 15/002; G01S 17/42; G01S 17/89; G01S 7/4808; G01S 5/16; G06F 2218/08
USPC .......................................................... 702/5
See application file for complete search history.

(56) References Cited

U.S. PATENT DOCUMENTS 7,304,729 B2     12/2007  Yasutomi et al.
9,776,320 B2 *  10/2017  Nishita ................ G01C 15/008
2006/0176473 A1   8/2006  Yasutomi et al.
2010/0256940 A1 * 10/2010 Ogawa .................... G01S 7/497
                                                                                356/243.8
2016/0216109 A1   7/2016  Kumagai et al.
(Continued)

FOREIGN PATENT DOCUMENTS

JP     2006-220514 A     8/2006

OTHER PUBLICATIONS

Yue Wang, CN 111366896 A, "A Method For Detecting A Reflecting Cylinder, Device, Electronic Device And Readable Storage Medium", Date published: Jul. 3, 2020 (Year: 2020).*
(Continued)

*Primary Examiner* — John H Le
(74) *Attorney, Agent, or Firm* — Chiesa Shahinian & Giantomasi PC

(57) ABSTRACT

A method and apparatus for determining the position of a laser scanner using one or more optical targets, each arranged at a known point. The apparatus includes: a ground control point position obtaining part which obtains information of arrangement positions of multiple optical reflection targets; a laser scanner approximate position data obtaining part which obtains an approximate position of a laser scanner; a laser scanning data obtaining part which obtains data of multiple luminescent points; a processing objective point extracting part which extracts multiple luminescent points having luminance exceeding a specific threshold value; and a laser scanner position calculating part which gives data of the arrangement position of the optical reflection target to each of the extracted multiple luminescent points so as to calculate position of the laser scanner.

3 Claims, 5 Drawing Sheets

(56) References Cited

U.S. PATENT DOCUMENTS

2020/0011664 A1     1/2020   Sasaki
2021/0080587 A1     3/2021   Sasaki

OTHER PUBLICATIONS

European Search Report mailed Sep. 2, 2022 in connection with European Patent Application No. 22164631.8, 8 pgs.

* cited by examiner

SURVEY DATA PROCESSING APPARATUS, SURVEY DATA PROCESSING METHOD AND SURVEY DATA PROCESSING PROGRAM

CROSS-REFERENCE TO RELATED APPLICATIONS

This application claims priority to Japanese Patent Application No. 2021-055353, filed Mar. 29, 2021, the disclosure of which is incorporated herein by reference in its entirety.

FIELD

The present invention relates to a surveying technique using a laser scanner.

BACKGROUND

There is a need to determine an installation position of a laser scanner in a case in which point cloud data is obtained by using a laser scanner. As a method of obtaining a position of a surveying apparatus, a method is known in which an optical target at a known position is used (see Patent Document 1).

Patent Document 1: Japanese Unexamined Japanese Patent Application Publication No. 2006-220514.

SUMMARY

The following conventional method is known. First, a laser scanner is installed at an unknown point. Then, an optical target is arranged at each of multiple known points, and the positions of these optical targets are determined by the laser scanner. Then, the position of the laser scanner is calculated by the backward intersection method.

In this method, it is necessary to determine the optical target at the laser scanner side. As a method for performing this determination, a method may be mentioned in which a luminescent point, having not less than a specific luminance, is identified as the optical target. However, in a case in which there is reflective material having the same or greater reflectivity than the optical target, it is necessary to identify which reflective luminescent point is the optical target.

It is necessary to perform the operation of this identification more efficiently, more accurately, and more easily. Under such circumstances, an object of the present invention is to provide a technique in which determination of the position of a laser scanner using one or more optical targets, each arranged at a known point, can be made more easily.

An aspect of the present invention is a survey data processing apparatus including: an optical reflection target position obtaining part which obtains information of arrangement positions of multiple optical reflection targets of which the arrangement positions are known; a laser scanner position obtaining part which obtains an approximate position of a laser scanner; a laser scanning data obtaining part which obtains data of multiple luminescent points and direction of each multiple luminescent point viewed from the laser scanner as laser scanning data by laser scanning by the laser scanner in a range containing the multiple optical reflection targets; a luminescent point extracting part which extracts multiple luminescent points having luminance exceeding a specific threshold value among multiple luminescent points; and a laser scanner position calculating part which gives data of the arrangement position of the optical reflection target to each of the extracted multiple luminescent points so as to calculate position of the laser scanner which performs the laser scanning as a provisionally calculated position by the backward intersection method, in which a condition in which a difference between the approximate position and the provisional position is not more than a threshold value or a condition in which the difference is the minimum is searched for so as to specify a luminescent point of the optical reflection target among the extracted multiple luminescent points.

In the present invention, an embodiment is desirable in which combinations of the extracted multiple luminescent points and data of the arrangement positions of the optical reflection targets used in calculation of the provisional calculated position are searched for, in a condition in which a difference between the approximate position and the provisional position is not more than a threshold value or a condition in which the difference is the minimum is satisfied.

An aspect of the present invention is a survey data processing method including steps of: obtaining information of arrangement positions of multiple optical reflection targets of which the arrangement positions are known; obtaining an approximate position of a laser scanner; obtaining data of multiple luminescent points and direction of each multiple luminescent point viewed from the laser scanner as laser scanning data by laser scanning by the laser scanner in a range containing the multiple optical reflection targets; extracting multiple luminescent points having luminance exceeding a specific threshold value among multiple luminescent points; and giving data of the arrangement position of the optical reflection target to each of the extracted multiple luminescent points so as to calculate position of the laser scanner which performs the laser scanning as a provisionally calculated position by the backward intersection method, in a condition in which a difference between the approximate position and the provisional position is not more than a threshold value or a condition in which the difference is the minimum is searched for so as to specify a luminescent point of the optical reflection target among the extracted multiple luminescent points.

An aspect of the present invention is a non-transitory computer recording medium storing computer executable instructions that, when executed by a computer processor, cause the computer processor to perform operations regarding a survey data processing program including: obtaining information of arrangement positions of multiple optical reflection targets of which the arrangement positions are known; obtaining an approximate position of a laser scanner; obtaining data of multiple luminescent points and direction of each luminescent point viewed from the laser scanner as a laser scanning data by laser scanning by the laser scanner in a range containing the multiple optical reflection targets; extracting multiple luminescent points having luminance exceeding a specific threshold value among multiple luminescent points; and giving data of the arrangement position of the optical reflection target to each of the extracted multiple luminescent points so as to calculate position of the laser scanner which performs the laser scanning as a provisionally calculated position by the backward intersection method, in a condition in which a difference between the approximate position and the provisional position is not more than a threshold value, or a condition in which the difference is the minimum is searched for so as to specify a luminescent point of the optical reflection target among the extracted multiple luminescent points.

Effects of Invention

According to the present invention, a technique can be used to more easily determine a position of a laser scanner using one or more optical targets arranged at one or more known points.

DETAILED DESCRIPTION

1. First Embodiment

Construction

Figure 1:
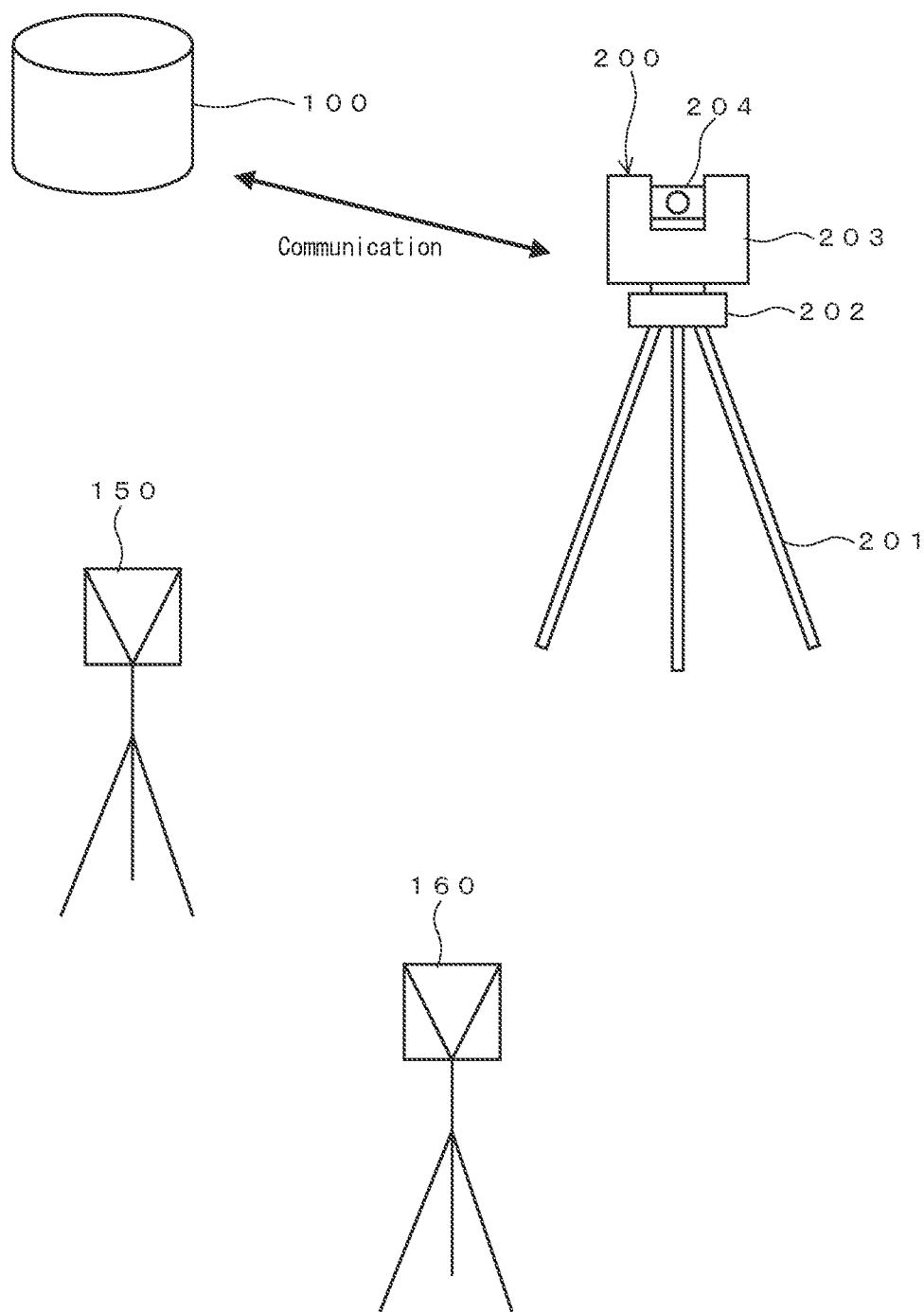
FIG. 1 is a conceptual diagram showing an embodiment.

FIG. 1 shows an overview of this embodiment. FIG. 1 shows a processing apparatus 100, a laser scanner 200, and reflection prisms 150, 160. The processing apparatus 100 is a data processing server functioning as a computer. As the processing apparatus 100, a PC or a dedicated operational unit can be used. An embodiment is possible in which function of the processing apparatus 100 is installed in the laser scanner 200, and an embodiment is also possible in which the processing apparatus 100 is constituted by a PC, dedicated terminal, or the like, and it is used near the laser scanner 200.

The laser scanner 200 includes a tripod 201 as supporting legs, a base 202 supported by the tripod, a horizontal rotation part 203 which is able to rotate horizontally on the base 202, a vertical rotation part 204 which is able to rotate vertically with respect to the horizontal rotation part 203. An optical system which irradiates and receives laser scanner light is arranged on the vertical rotation part 204.

While vertically rotating the vertical rotation part 204, the laser scanning light is irradiated, and reflected light is received at a specific repeated frequency. By a combination of vertical rotation of the vertical rotation part 204 and horizontal rotation of the horizontal rotation part 203, laser scanning is performed within a set range.

Relationships between time and angle position of the horizontal rotation part 203, and relationships between time and angle position of the vertical rotation part 204, are accurately measured by a clock and an encoder. Relationships between timing of irradiation of laser scanning light and time are also accurately controlled. In this way, irradiation direction of each laser scanning light (injection direction of each reflected light) is accurately measured. In addition, based on difference (phase difference) in timing of light reception between a measured light propagated in a standard optical path arranged inside the laser scanner 200 and an actual measured light, distance to the reflection point is calculated. The distance to the reflection point can be calculated from the propagation time of the measured light.

The reflection prisms 150 and 160 are each an optical reflection target having retroreflective properties in which incident light is reflected in the opposite direction by 180 degrees. Here, a reflection prism commercially available for surveying is used. The number of reflection prisms is not limited to two, and three or more may be used. A member having retroreflective properties other than a reflection prism may be used as the optical reflection target. For example, a retroreflective member using transparent beads may be used as the optical reflection target.

Figure 2:
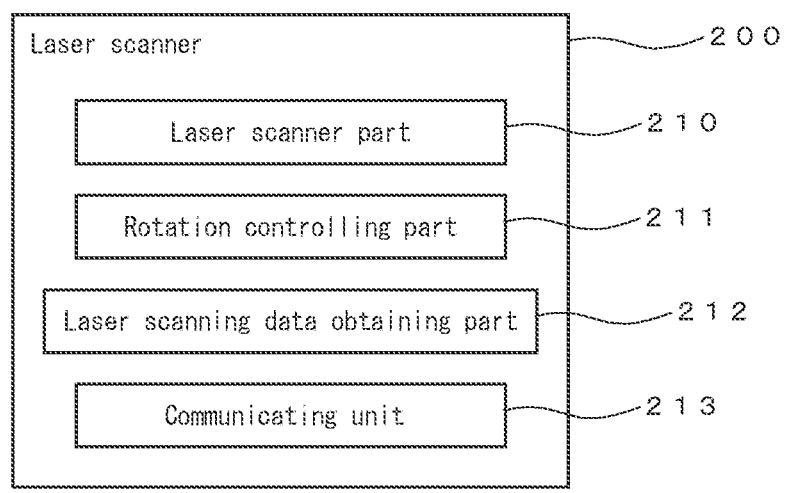
FIG. 2 is a block diagram of a laser scanner.

FIG. 2 shows a block diagram of the laser scanner 200. A laser scanner part 210 includes a light-emitting part of scanning light, a light-receiving part, an optical system, and an electronic circuit performing necessary processes for action thereof. A rotation controlling part 211 controls rotation of the horizontal rotation part 203 and the vertical rotation part 204 and measures rotation angle. A laser scanning data obtaining part 212 obtains data of laser scanning which the laser scanner part 210 obtained (laser scanning data).

The laser scanning data contains information regarding each of the scanning lights (measured light), such as direction, light-receiving intensity, and distance to the reflection point.

A communication unit 213 communicates with the processing apparatus 100. Communication is performed via wire or via wireless. In a case in which a server is used as the processing apparatus 100, communication is performed via internet line. As a means for wireless communication, a wireless LAN can be used. The other end of the communication is not limited to processing apparatus 100, and it can be an operating terminal, another controlling unit, a PC, or the like.

Figure 3:
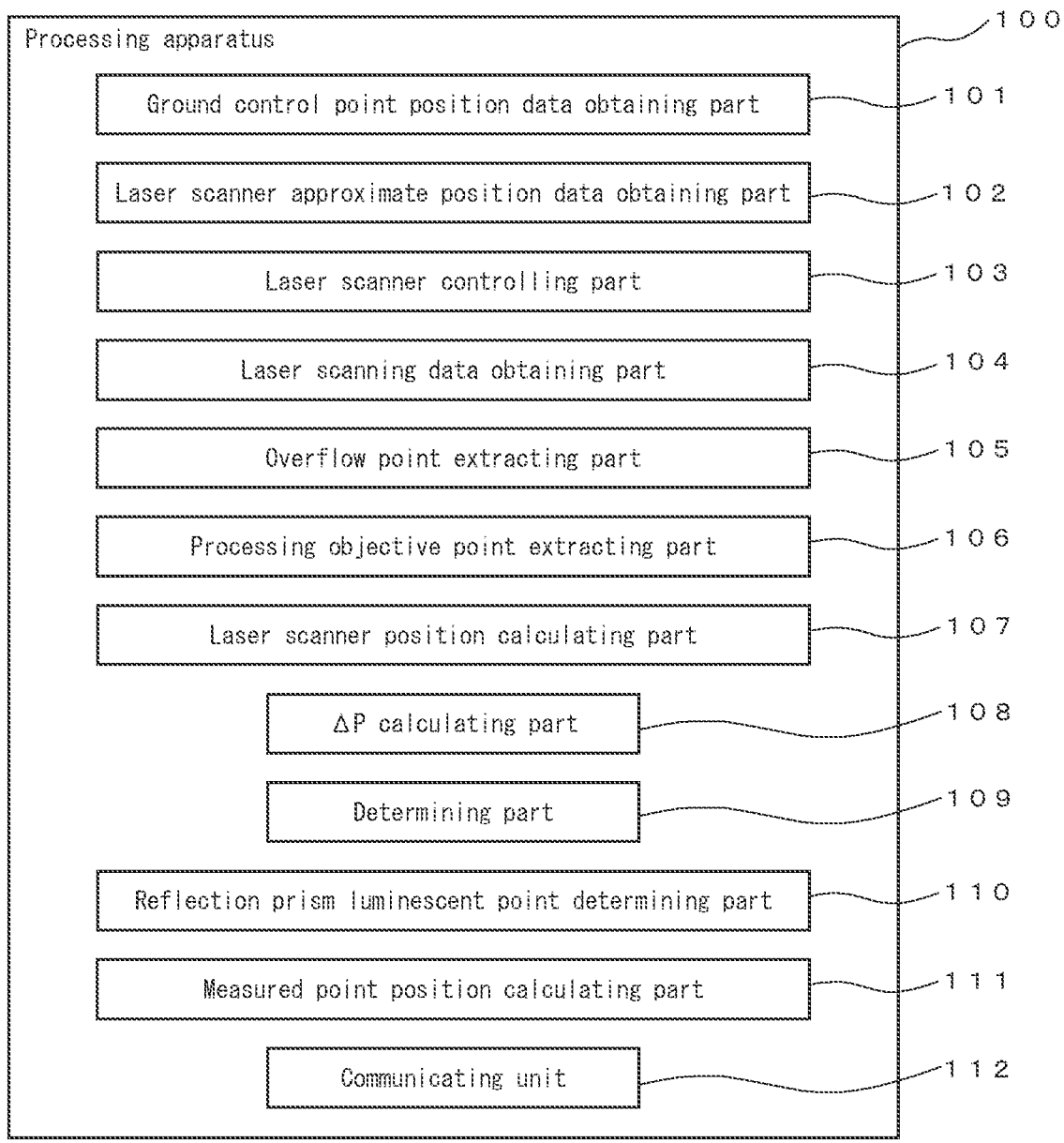
FIG. 3 is a block diagram of a processing apparatus.

FIG. 3 shows a block diagram of the processing apparatus 100. Each of the functioning parts of the processing apparatus 100 is constituted by software executing a program to realize each function by a CPU, or is constituted by dedicated hardware. The processing apparatus 100 includes a ground control point position data obtaining part 101, a laser scanner approximate position data obtaining part 102, a laser scanner controlling part 103, a laser scanning data obtaining part 104, an overflow point extracting part 105, a processing object point extracting part 106, a laser scanner position calculating part 107, a ΔP calculating part 108, a determining part 109, a reflection prism luminescent point determining part 110, a measured point position calculating part 111, and a communicating unit 112.

The ground control point position data obtaining part 101 performs a process regarding a step S101 mentioned below. The laser scanner approximate position data obtaining part 102 performs a process regarding a step S102 mentioned below. The laser scanner controlling part 103 outputs a control signal instructing the laser scanner 200 to perform an action. For example, the laser scanner controlling part 103 may perform a process regarding a step S103 mentioned below.

The laser scanning data obtaining part 104 obtains laser scanning data which is measured by the laser scanner 200.

The overflow point extracting part 105 performs a process regarding a step S105 mentioned below. The processing object point extracting part 106 performs a process regarding a step S106 mentioned below. The laser scanner position calculating part 107 performs processes regarding a step S107 and a step S112 mentioned below. The ΔP calculating part 108 performs a process regarding a step S108 mentioned below. The determining part 109 performs a process regarding a step S109 mentioned below. The reflection prism luminescent point determining part 110 performs a process regarding a step S110 mentioned below.

The measured point position calculating part 111 calculates a position of a reflection point of measured light (laser scanning point). The calculation of the reflection point of the measured light is performed based on direction and distance of the measured light. The communicating unit 112 communicates with the laser scanner 200 or with another device.

Example of Steps of Processing

Figure 4:
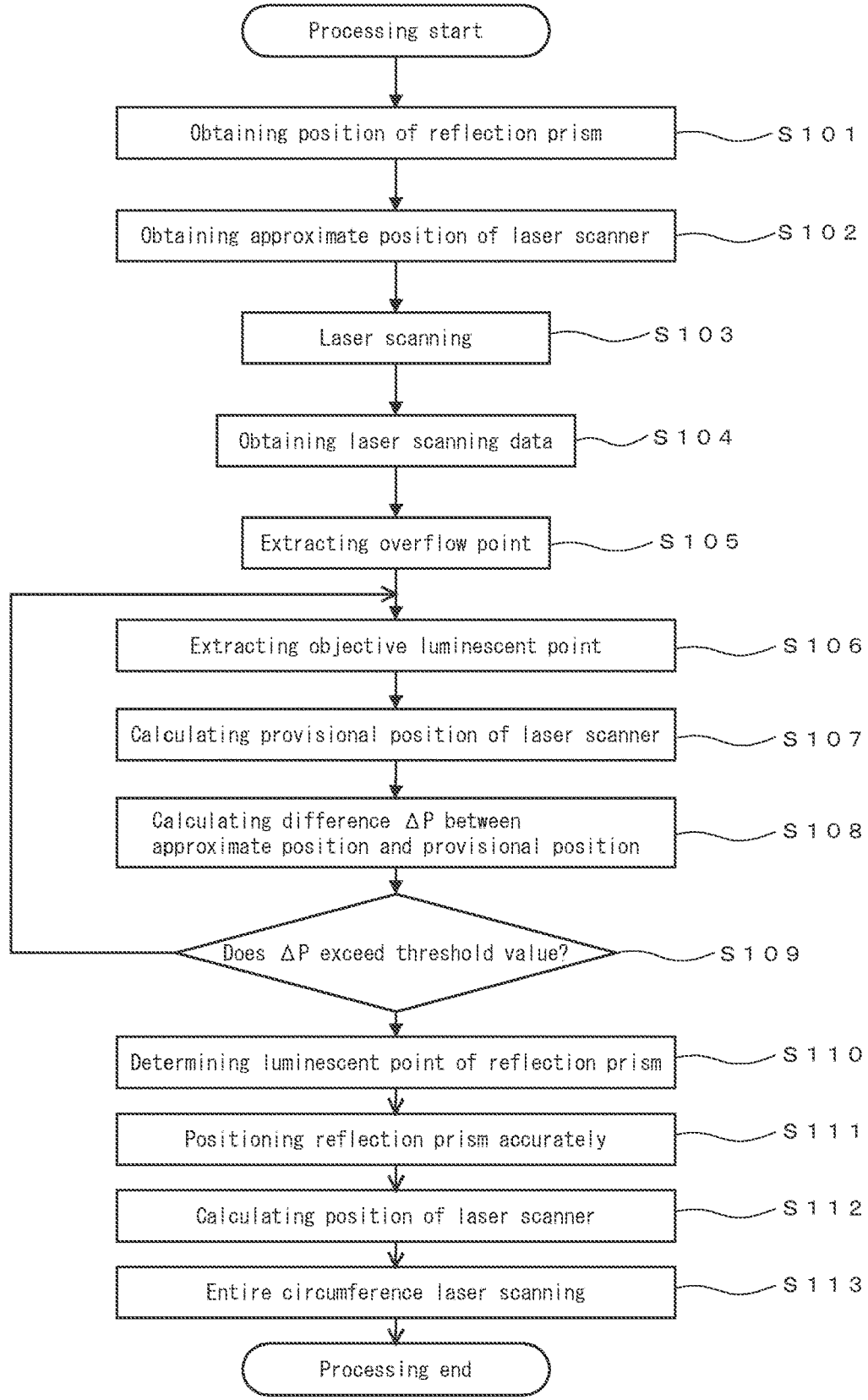
FIG. 4 is a flowchart diagram showing an example of steps of processing.

FIG. 4 shows one example of steps of processing. A program which executes the processing of FIG. 4 is stored in an appropriate storage medium and is executed by the CPU of the processing apparatus 100. Here, two reflection prisms are installed. Of course, the number of reflection prisms may be three or more. Before the processing, the reflection prisms 150 and 160 are arranged at known points of known positions. Position data (coordinates) of the arranged points of the reflection prisms 150 and 160 are preliminarily prepared as ground control point data.

It should be noted that the position data is one which is in an absolute coordinate system. The absolute coordinate system is a coordinate system which is used in a case in which map information used in the GNSS or the like is handled. For example, a position in the absolute coordinate system is described by latitude, longitude, and altitude. As the coordinate system, a local coordinate system can also be used.

First, positions of the reflection prisms 150 and 160 are obtained (Step S101). Next, an estimated position (approximate position) of the laser scanner 200 is obtained (Step S102). The position of the laser scanner 200 obtained in this step is obtained by position determination by a Wi-Fi device, by position determining using a GNSS position measuring device, by reading from drawing data or the like. It is desirable that accuracy of the position be not greater than on the order of several tens of centimeters.

Next, laser scanning of the entire circumference, with the laser scanner 200 as the center, is performed (Step S103). The laser scanning is performed in accordance with a control signal which is output from the laser scanner controlling part 103. The laser scanning in this step is performed by an ordinary laser scanning condition (output) in which saturation of a light-receiving device by reflected light from the reflection prisms is not considered. In this case, the light-receiving part of the laser scanner 200 is saturated if reflected light is received from the reflection prisms and an objective material having a reflection ratio not less than a certain level.

After the step S103, laser scanning data is obtained (Step S104). The laser scanning data can be obtained at the same time with laser scanning. Next, among the laser scanning data obtained in the step S104, one ore more laser scanning data of luminescent points (reflection points) having an intensity greater than a threshold value are extracted (Step S105). Here, a luminescent point (reflection point) is extracted in which output of a detecting device (photodiode or the like) detecting the reflected light has overflowed (is saturated). It is also possible that a threshold value is assumed and a luminescent point having an output greater than the assumed value is selected.

The number of luminescent points extracted in the step S105 is at least two. In a case in which there is a strong reflected light from objects other than the reflection prisms, three or more luminescent points are extracted in the step S105. Information of the luminescent points obtained in the step S105 is information of direction of a luminescent point viewed from the laser scanner 200.

Next, two points are selected among the multiple luminescent points extracted in the step S105 (step S106). In this processing, by using ground control point data, a combination of two points is not selected if they are in an impossible positional relationship. For example, two points that are extremely far apart in a vertical direction from each other, two points extremely and impossibly far apart in a horizontal direction viewed from a laser scanning range, or the like, are not selected.

Next, the position information obtained in the step S101 is imparted to the two points selected in the step S106, and position of the laser scanner 200 is calculated by the backward intersection method (Step S107). This position is set as a provisionally calculated position of the laser scanner 200.

Hereinafter a process performed in step S107 is explained. In FIG. 6, it is estimated that the origin P is a position (optical origin) of the laser scanner 200, and that P1 and P2 are the laser scanning points. Here, a direction in which the point P1 is viewed from the point P, and a direction in which the point P2 is viewed from the point P, can be obvious based on the laser scanning data obtained in the step S104.

In this step, although it is not obvious whether or not the points P1 and P2 are reflection points from the reflection prisms, the point P1 is provisionally assumed to be the reflection point from the reflection prism 150, and the point P2 is provisionally assumed to be the reflection point from the reflection prism 160. Then, since the positions of P1 and P2 are given, the position of the point P can be calculated based on a principle of triangle surveying (backward intersection method).

That is, a direction of the point P1 viewed from the point O, and a direction of the point P2 viewed from the point O, are obvious from the laser scanning data. Therefore, a triangle is defined in which vertex positions are P, P1, and P2, and the size is unknown. Here, the size of the triangle can be determined if the positions of the vertexes P1 and P2 of this triangle are given. Furthermore, since coordinates of two vertexes P1 and P2 are determined, the position of vertex P can be calculated. The position of this vertex P is the provisionally calculated position of the laser scanner. The above is a principle of the process performed in the step S107.

Next, a difference ΔP between the approximate position of the laser scanner obtained in the step S102, and the provisionally calculated position obtained in the step S107, is calculated (Step S108).

Next, whether or not the ΔP calculated in the step S108 exceeds the predetermined threshold value is determined (Step S109). Here, in a case in which the ΔP exceeds the threshold value, then, returning to the step S106, a different combination of reflective luminescent points is selected, and the steps S106 to S109 are executed again.

In a case in which the difference thereof is not greater than the threshold value in the step S109, then proceeding to step S110, the two points selected in the step 106 are specified as the reflection points of the reflection prisms 150 and 160 (Step S110).

The process of the step S109 has the following meanings. In a case in which luminescent points which are not from the reflection prisms are selected in the step S106, this means that coordinate values which do not exist on a line connecting the optical origin of the laser scanner 200 to the luminescent points are given to the luminescent points in order to calculate position of the laser scanner 200, and therefore, a difference ΔP between the provisionally calculated position and the approximate position increases.

On the other hand, in a case in which actual luminescent points which are from the reflection prisms 150 and 160 are selected, it means that coordinate values which exist on a line connecting the optical origin of the laser scanner 200 to the luminescent points are given to the luminescent points in order to calculate position of the laser scanner 200, and therefore, a difference ΔP between the provisionally calculated position and the approximate position is the minimum among obtainable combinations. Using this principle, determination of whether or not it is true is performed among candidates of the luminescent points of the reflection prism in the step S109.

According to the above steps, the luminescent points of the laser scanning lights from the reflection prisms 150 and 160 are determined (Step S110). Here, it is safe to say that the steps S106 to S109 are a process to search for combinations of arranged positions of the reflection prisms in which the difference between the approximate position and the provisionally calculated position is not greater than the threshold value or is the minimum.

The threshold value used in the step S109 can be calculated by a preliminary experiment. An embodiment is possible in which this threshold value is multiply prepared in accordance with accuracy of the approximate position of the laser scanner obtained in the step S102, the threshold values are subtilized based on accuracy of the approximate position used.

After obtaining the luminescent points of the reflection prisms 150 and 160, laser scanning is performed again around the direction as the center, so that positions of the reflection prisms 150 and 160 are determined accurately (Step S111). In this way, the accurate position of the reflection prisms 150 and 160 can be obtained in the coordinate system in which the laser scanner 200 is the origin.

In the step S111, a laser scanning is performed in which light intensity is reduced to an extent enabling measuring distance of the reflection prism, that is, laser scanning is performed in an output in which a light-receiving part is not saturated by the reflected light from the reflection prism, in order to measure position of the reflection prisms 150 and 160 accurately. In practice, by irradiating and receiving laser scanning light via a dark filter, or by receiving laser scanning light via a dark filter, laser scanning is performed in conditions in which a light-receiving part is not saturated due to strong incident light.

Figure 5:
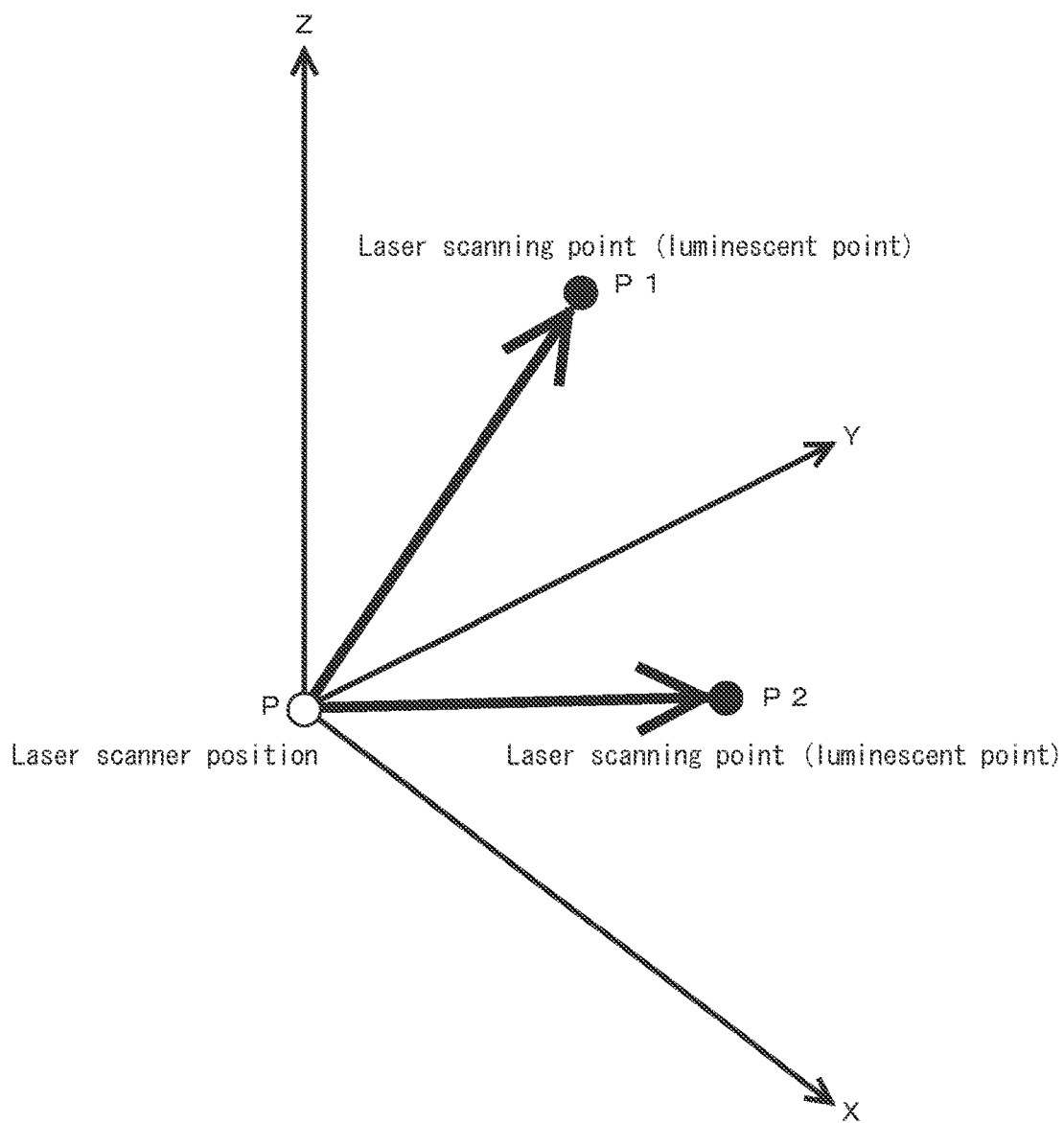
FIG. 5 is a conceptual diagram of the backward intersection method.

After accurate positioning of the reflection prisms 150 and 160, by the backward intersection method, of which the principle is shown in FIG. 5, a position of the laser scanner 200 in the absolute coordinate system is calculated (Step S112).

After calculating the position of the laser scanner 200 in the absolute coordinate system, the position in the absolute coordinate system of each point (each reflection point) in the laser scanning data obtained in the step S104 is calculated in order to obtain point cloud data (Step S113).

The laser scanning data obtained in the step S104 is direction and distance of each point viewed from the laser scanner 200. Here, the position of the laser scanner 200 in the absolute coordinate system is calculated in the step S112. Therefore, the position in the absolute coordinate system of each point in the laser scanning data obtained in the step S104 can be calculated. This process is performed in the step S113.

It should be noted that regarding the reflected light from the reflection prism in the laser scanning data obtained by the step S104, accurate distance information cannot be obtained by influence of saturation in the light-receiving part. Therefore, one which is obtained in the step S111 is employed as the position data of the reflection prism.

Conclusions

As explained so far, the present embodiment discloses the processing apparatus 100, including: a ground control point position obtaining part 101 which obtains information of arrangement position of multiple optical reflection targets of which the arrangement positions are known; a laser scanner approximate position data obtaining part 102 which obtains an approximate position of a laser scanner; a laser scanning data obtaining part 104 which obtains data of multiple luminescent points and direction of each of the multiple luminescent points viewed from the laser scanner as a laser scanning data by laser scanning by the laser scanner in a range containing the multiple optical reflection targets; a processing objective point extracting part 106 which extracts multiple luminescent points having luminance exceeding a specific threshold value among the multiple luminescent points; and a laser scanner position calculating part 107 which gives data of the arrangement position of the optical reflection target to each of the extracted multiple luminescent points so as to calculate position of the laser scanner which performs the laser scanning as a provisionally calculated position by the backward intersection method, in a condition in which a difference between the approximate position and the provisional position is not more than a threshold value or a condition in which the difference is the minimum is searched for so as to specify the luminescent point of the optical reflection target among the extracted multiple luminescent points.

According to this processing apparatus 100, an optical reflection target is arranged at a known point, and the laser scanner is arranged at a position which is at an unknown point, but at an approximate position that is obvious. By these arrangements, identification of the reflection prism viewed from the laser scanner is possible, and operation of this process is facilitated, and burden for this process is small. Therefore, determination of position of a laser scanner using an optical target arranged at a known point can be performed more easily.

Modification 1

The steps S107 and S108 are executed for all of the combinations of two points selected from the multiple luminescent points extracted in the step S105 (round-robin), and a combination of two points having the minimal ΔP is obtained as the reflection point of the reflection prism.

Modification 2

An embodiment is also possible in which the laser scanning in the step S103 is performed in a condition in which the light-receiving part is not saturated by reflected light of the reflection prism (an embodiment in which laser scanning is performed using a dark filter). In this case, since a point having low luminance is not detected, and a point having high luminance is preferentially obtained, the step S105 may be omitted. Of course, the step S105 may be performed.

Furthermore, in this case, after the step S112, after detaching the dark filter, laser scanning of the entire circumference is performed and a position of each point obtained thereby is calculated in the step S113. In this case, position of a saturation point is calculated by using the laser scanning data obtained in the step S103 in which laser scanning is performed in a condition in which saturation does not occur.

OTHER MATTERS

It is also possible for multiple dark filters, each having different extinction properties, to be prepared, and filters may be used by switching them. It is also possible for light-emitting intensity to be changed so as to avoid saturation. It is also possible for the laser scanning of step S104 to be performed narrowly in a specific range.

EXPLANATION OF REFERENCE NUMERALS

100: Processing apparatus, 150: reflection prism, 160: reflection prism, 200: laser scanner, 201: tripod, 202: base, 203: horizontal rotating part, 204: vertical rotating part.

What is claimed is:

1. A survey data processing apparatus comprising:
   an optical reflection target position obtaining part which obtains information of arrangement positions of multiple optical reflection targets of which arrangement positions are known;
   a laser scanner position obtaining part which obtains an approximate position of a laser scanner by position determination by a Wi-Fi device, by position determining using a GNSS position measuring device, or by reading from drawing data;
   a laser scanning data obtaining part which obtains data of multiple luminescent points and direction of each multiple luminescent point viewed from the laser scanner as laser scanning data by laser scanning by the laser scanner in a range containing the multiple optical reflection targets;
   a luminescent point extracting part which extracts multiple luminescent points having luminance exceeding a specific threshold value among multiple luminescent points;
   a laser scanner position calculating part which selects a same number of luminescent points as the multiple optical reflection targets among the extracted multiple luminescent points and which gives them data of the arrangement position of the multiple optical reflection target as a position data of the selected luminescent points so as to calculate position of the laser scanner which performs the laser scanning as a provisionally calculated position by a backward intersection method;
   a determining part which determines whether or not a difference between the approximate position and the provisional position is not more than a threshold value; and
   a luminescent point determining part which determines the selected luminescent point as a reflection point of an optical reflection target of the multiple optical reflection targets in a case in which the difference is not more than the threshold value.

2. A survey data processing method comprising steps of:
   obtaining information of arrangement positions of multiple optical reflection targets of which the arrangement positions are known;
   obtaining an approximate position of a laser scanner by position determination by a Wi-Fi device, by position determining using a GNSS position measuring device, or by reading from drawing data;
   obtaining data of multiple luminescent points and direction of each multiple luminescent point viewed from the laser scanner as laser scanning data by laser scanning by the laser scanner in a range containing the multiple optical reflection targets;
   extracting multiple luminescent points having luminance exceeding a specific threshold value among multiple luminescent points;
   selecting a same number of luminescent points as the multiple optical reflection targets among the extracted multiple luminescent points, and giving them data of the arrangement position of the multiple optical reflection target as a position data of the selected luminescent points so as to calculate position of the laser scanner which performs the laser scanning as a provisionally calculated position by a backward intersection method;
   determining whether or not a difference between the approximate position and the provisional position is not more than a threshold value; and
   determining the selected luminescent point as a reflection point of an optical reflection target of the multiple optical reflection targets in a case in which the difference is not more than the threshold value.

3. A non-transitory computer recording medium storing computer executable instructions that, when executed by a computer processor, cause the computer processor to perform operations for a survey data processing program, comprising:
   obtaining information of arrangement positions of multiple optical reflection targets of which the arrangement positions are known;
   obtaining an approximate position of a laser scanner by position determination by a Wi-Fi device, by position determining using a GNSS position measuring device, or by reading from drawing data;
   obtaining data of multiple luminescent points and direction of each multiple luminescent point viewed from the laser scanner as laser scanning data by laser scanning by the laser scanner in a range containing the multiple optical reflection targets;
   extracting multiple luminescent points having luminance exceeding a specific threshold value among multiple luminescent points;
   selecting a same number of luminescent points as the multiple optical reflection targets among the extracted multiple luminescent points, and giving them data of the arrangement position of the multiple optical reflection target as a position data of the selected luminescent points so as to calculate position of the laser scanner which performs the laser scanning as a provisionally calculated position by a backward intersection method;
   determining whether or not a difference between the approximate position and the provisional position is not more than a threshold value; and
   determining the selected luminescent point as a reflection point of an optical reflection target of the multiple optical reflection targets in a case in which the difference is not more than the threshold value.

\* \* \* \* \*